US006616852B2

(12) United States Patent
Roberts et al.

(10) Patent No.: US 6,616,852 B2
(45) Date of Patent: Sep. 9, 2003

(54) MODULAR FILTER SYSTEM

(75) Inventors: R. Lee Roberts, Chadds Ford, PA (US); Mark Kevin Addison, Bear, DE (US)

(73) Assignee: RG Delaware, Inc., Wilmington, DE (US)

( * ) Notice: Subject to any disclaimer, the term of this patent is extended or adjusted under 35 U.S.C. 154(b) by 0 days.

(21) Appl. No.: 09/892,515

(22) Filed: Jun. 28, 2001

(65) Prior Publication Data
US 2003/0000883 A1 Jan. 2, 2003

(51) Int. Cl.⁷ .............................................. B01D 24/46
(52) U.S. Cl. ...................... 210/793; 210/136; 210/264; 210/271; 210/275
(58) Field of Search ................. 210/793, 136, 210/264, 271, 275

(56) References Cited

U.S. PATENT DOCUMENTS

| | | | | |
|---|---|---|---|---|
| 2,302,449 A | * | 11/1942 | Laughlin | 210/275 |
| 2,302,450 A | * | 11/1942 | Laughlin | 210/264 |
| 3,984,326 A | * | 10/1976 | Bendel | 210/264 |
| 4,308,141 A | * | 12/1981 | Clendenen | 210/264 |
| 4,764,288 A | * | 8/1988 | Walker et al. | 210/793 |
| 5,552,045 A | * | 9/1996 | Wagner | 210/264 |

OTHER PUBLICATIONS

"ABW® Automatic Backwash Filter", pp. 1 to 12,© May 1999.

* cited by examiner

Primary Examiner—Ivars Cintins
(74) Attorney, Agent, or Firm—Merek, Blackmon & Voorhees, LLC

(57) ABSTRACT

A modular filter system having a mechanism for performing a filter to waste step on the last cell of a multi-cell system following backwashing. A method of operating a modular filter system in which a filter to waste step is performed on the last cell of a multi-cell system after backwashing.

23 Claims, 2 Drawing Sheets

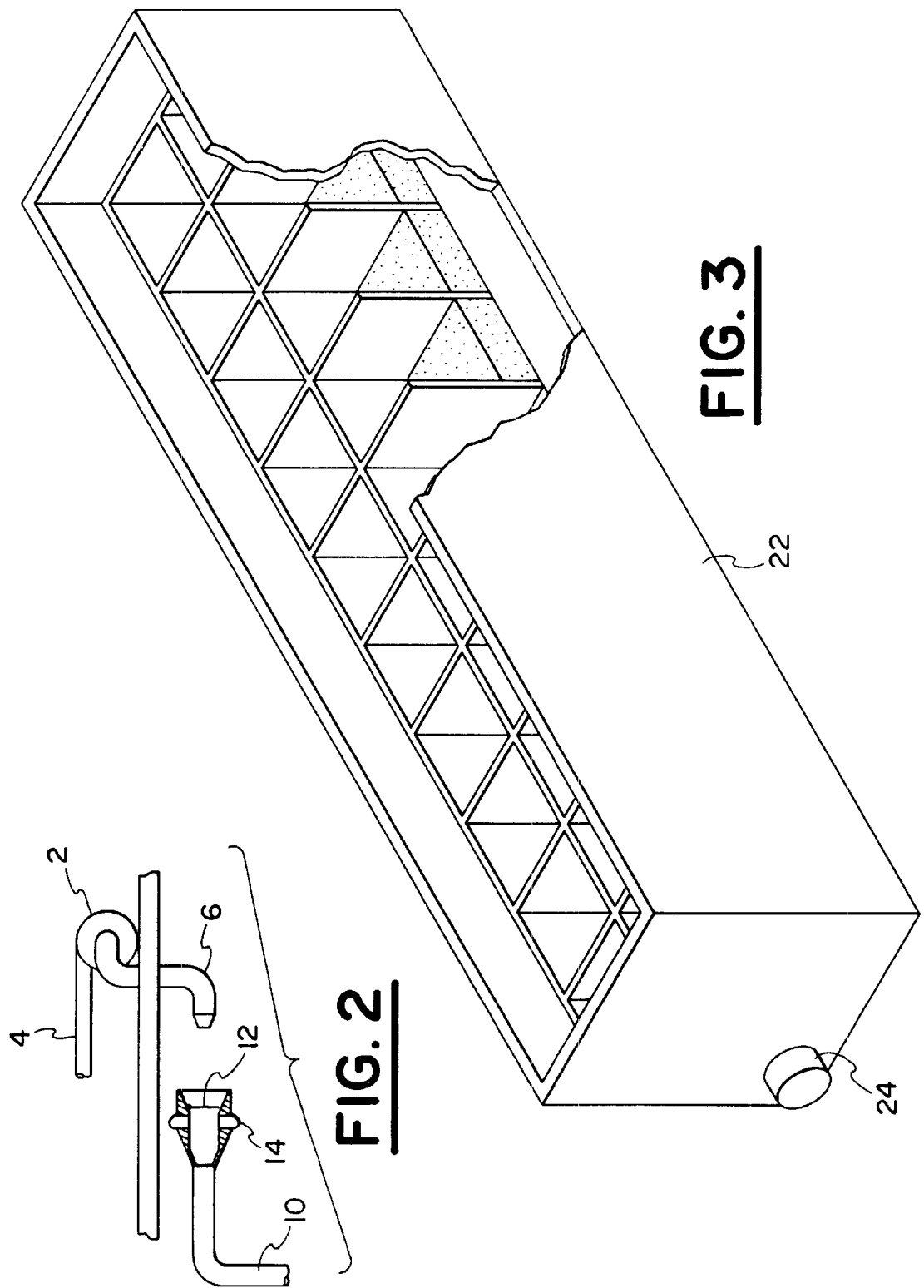

MODULAR FILTER SYSTEM

FIELD OF THE INVENTION

The present invention is directed to a filter system for filtering water and/or wastewater. More particularly, the present invention is directed to a modular filter system for filtering water and/or wastewater.

BACKGROUND OF THE INVENTION

Modular filter systems, i.e., filter systems having a plurality of filter compartments or cells rather than a single large filter bed for a given filter unit, were primarily developed to reduce the size and complexity of the backwash or cleaning structure of single, large filter beds as well as obviate the need for a total system shutdown during the backwash or cleaning procedure. One such modular filter system is disclosed in U.S. Pat. No. 4,308,141 ("'141 patent) the entire contents of which are incorporated herein by reference.

The '141 patent discloses a filter system that utilizes a tank or reservoir having a transversely positioned porous filter element vertically spaced above the floor or bottom of the reservoir. Wall partitions are used to divide the tank into a plurality of smaller individual compartments or cells that have a common underdrain and plenum chamber. Influent or water containing undesired suspended particulate matter is introduced into the reservoir to filter the same. Gravity causes the influent to pass through the media in each of the cells or compartments. The filtered water or effluent is drawn away by a drain or effluent discharge located beneath or in the lower portion of the filter that communicates with the common plenum.

After a period of time of operating the modular filter system of the '141 patent to filter influent, the system requires cleaning or backwashing to remove the particulate matter collected in the media contained in the individual cells. The '141 patent teaches sequentially backwashing or cleaning each of the individual cells. Because the cells are backwashed sequentially, the filter system never needs to be shutdown for a backwash or filter cleaning cycle and all of the filter cells except the one being cleaned are operable continuously.

The backwash system of the '141 patent includes a hydraulically isolating, backwash hood assembly and associated mobile carriage and platform support assembly. The backwash hood assembly depends from the mobile carriage and platform assembly and is initially centered over one of the six individual cells. Subsequently, the hood assembly is lowered to form a watertight seal with a particular cell to be backwashed. A backwash pump is activated creating a negative pressure within the backwash hood. Effluent created by adjacent individual cells is drawn up from the common underdrain through the media in the cell being backwashed to expand and wash the media. The effluent used to backwash a given cell is directed to waste through the hood assembly. This procedure is subsequently performed on all remaining individual cells.

In the commercial application of the '141 patent, the effluent discharge is closed during the backwash procedure. Hence, all effluent from a given bank of cells having a common plenum during backwashing is directed to waste through the hood assembly. Once backwashing is complete, the effluent valve is opened thereby directing the effluent to a storage tank or other suitable location for storing filtered water.

Neither the '141 patent or its commercial embodiment perform a filter to waste step for the last individual cell prior to opening the effluent valve. The '141 patent does not disclose or suggest any structure for performing such a step. This is a significant draw back of the modular filter system disclosed in the '141 patent. Without a filter to waste step performed on the last individual cell prior to opening the effluent discharge following backwashing, there exists a distinct possibility that the effluent will not be satisfactorily cleansed of undesirable impurities. Further, the suitably of the modular filter system of the '141 patent and its commercial embodiment to filter water and wastewater is limited by regulations which require a filter to waste step. It should be noted that a filter to waste step is customarily performed in conventional filters, i.e., a filter having a single large filter bed per filter unit, when conventional filters are used in potable water applications. A filter to waste step includes passing fluid through a filter bed after backwashing but prior to opening the effluent discharge to ensure that any or at least most undesired impurities are removed from the filter bed prior to returning the filter system to its filtration mode.

The present invention overcomes the disadvantages of the '141 patent and its commercial embodiment by providing a novel and unobvious method and apparatus for readily and inexpensively performing a filter to waste step on the last cell to be backwashed.

OBJECTS AND SUMMARY OF THE INVENTION

An object of the present invention is to provide a novel and unobvious modular filter system.

Another object of the present invention is to provide a modular filter system that overcomes one or more disadvantages of previously known modular filter systems.

A further object of the present invention is to provide a modular filter system with a mechanism for simply and inexpensively performing a filter to waste step or cycle following backwashing of the last cell of a multi-cell system.

Yet a further object of the present invention is to provide a modular filter system that avoids and/or reduces the possibility of the discharge of effluent having undesired impurities into a filtered water storage device or other location from which consumers obtain potable water.

It must be understood that no one embodiment of the present invention need include all of the aforementioned objects of the present invention. Rather, a given embodiment may include one or more of the aforementioned objects. Accordingly, these objects are not to be used to limit the scope of the claims of the present invention.

In summary, one embodiment of the present invention is directed to a modular filter system having a mechanism for performing a filter to waste step on the last cell of a multi-cell system following backwashing. Another embodiment of the present invention is directed to a method of operating a modular filter system in which a filter to waste step is performed on the last cell of a multi-cell system after backwashing.

BRIEF DESCRIPTION OF THE DRAWINGS

FIG. 2 is an enlarged view of several components of the filter to waste mechanism in accordance with a preferred embodiment of the present invention.

FIG. 3 is a perspective view of a bank of cells for a modular filter system formed in accordance with a most preferred embodiment of the present invention.

DETAILED DESCRIPTION OF THE PREFERRED EMBODIMENT

Figure 1:
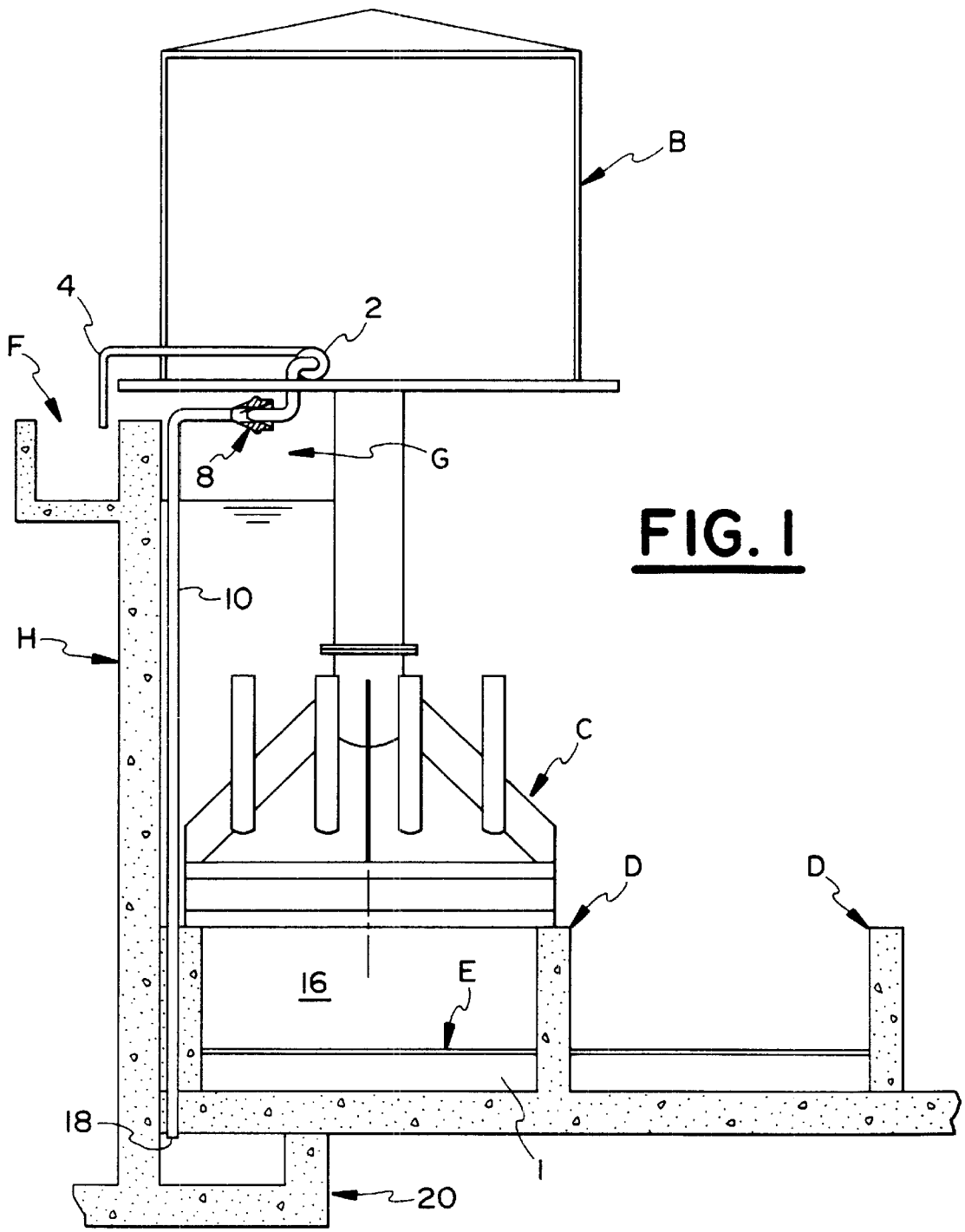
FIG. 1 is a fragmentary cross-sectional view of a preferred embodiment of the present invention.

The preferred forms of the invention will now be described with reference to FIGS. 1 through 3. The appended claims are not limited to the preferred embodiments and no term used herein is to be given a meaning other than its ordinary meaning unless accompanied by a statement that the term "as used herein is defined as follows."

FIGS. 1 and 2

Referring to FIGS. 1 and 2, a modular filter system A is depicted. The modular filter system A includes pump house B, a traveling backwash hood C, a plurality of filter cells D, an underdrain E, a waste trough F, a filter to waste device G and a reservoir or tank H. Preferably, the plurality of cells form a bank in that each of the cells shares a common plenum as illustrated in FIG. 1 by reference numeral 1, i.e., they are in fluid communication with each other. The preferred form of the modular filter system A is as described in U.S. Pat. No. 4,308,141 with the exception of the filter to waste device G. Therefore, only the filter to waste device G will be described in detail hereinafter.

Referring to FIGS. 1 and 2, filter to waste device G includes a filter to waste pump 2, a filter discharge conduit 4, a filter to waste probe 6, a docking station 8, and a filter to waste suction conduit 10. The docking station 8 includes a swing type check valve 12 and an expansion joint 14. The expansion joint eliminates and/or reduces the stresses caused in joining the docking station 8 with probe 6. Check valve 12 is depicted in the open position in FIG. 1 and in the closed position in FIG. 2. In the open position, fluid may pass from waste suction conduit 10 through probe 6 and out discharge conduit 4. In the closed position, the check valve 12 will prevent fluid from flowing in the manner just described.

As is seen in FIG. 1, the docking station 8 is connected to the uppermost end of the filter to waste suction conduit 10 in a fluid tight manner. It will be readily appreciated that the docking station 8 could alternatively be connected to waste probe 6. The filter to waste pump 2 is connected to filter to waste probe 6 and filter to waste discharge conduit 4 in a fluid tight manner. It will be readily appreciated that the fluid tight connection may be made in any known manner. Filter to waste pump 2, filter to waste probe 6 and filter to waste discharge conduit 4 are fixed to the pump house B. It will be readily appreciated that any conventional fastening device may be used. Because the pump 2, probe 6 and conduit 4 are fixed to the pump house B, these elements move as the pump house B moves to align with any given filter cell D. Preferably, pump house B is moved in the same manner as disclosed in U.S. Pat. No. 4,308,141. As seen in FIG. 1, filter to waste discharge conduit 4 empties into waste trough F. Alternatively, discharge conduit 4 could be designed such that it empties into an intermediate trough (not shown) that in turn empties into waste trough F.

Filter to waste suction conduit 10 is fixed to the reservoir H adjacent the last cell in the multi-cell system to be backwashed. Referring to FIG. 1, conduit 10 is positioned adjacent cell or compartment 16. Conduit 10 can be held in place by any conventional fastening or support structure. Conduit 10 is positioned adjacent cell or compartment 16, because this cell is predetermined to be the last cell to be backwashed. The lowermost end 18 of conduit 10 penetrates the filter to the effluent gullet 20.

Filter to waste pump 2 is preferably a suction pump but can be any type of pump, which will operate to draw fluid upwardly through suction conduct 10. Most preferably, the flow rate of pump 2 is proportional to the filter loading rate multiplied by the area of a given cell or compartment D. For example, where the filter loading rate is 5 gallons per minute (gpm) per square foot and the area of cell D is 64 square feet (i.e., 8'×8'), then the flow rate of the pump 2 would preferably be 320 gallons per minute.

Operation of the Modular Filter System Depicted in FIGS. 1 and 2

During a filtering mode, influent water passes through an inlet opening (not shown) and into reservoir or tank H. Preferably, the inlet opening for the reservoir or tank H is similar to that disclosed in U.S. Pat. No. 4,308,141. However, the position and size of the inlet opening may be varied as desired. Preferably, the flow rate of influent during a filtration mode is approximately 5 gpm/sq.ft. However, the flow rate of the influent may be varied as desired. Gravity causes the influent to pass through the media in the individual cells and collect in the underdrain E. The fluid is subsequently discharged through an effluent discharge outlet similar to that disclosed in U.S. Pat. No. 4,308,141. Once again, it should be kept in mind that the location and size of the effluent outlet may be varied as desired. Preferably, the underdrain E is the type of underdrain described in U.S. Pat. No. 4,308,141, which includes a porous plate. However, any type of conventional underdrain could be used. Further, it will be readily appreciated that the filter media in any given cell may include one or more gravel support layers thereby obviating the need for a porous plate.

During the filtration operation, the hood C is raised and thereby disengaged from the cells. Preferably, the hood C is raised and lowered in a manner similar to that disclosed in U.S. Pat. No. 4,308,141. However, it will be readily appreciated by those of ordinary skill in the art that the hood C may be raised and lowered by employing numerous conventional devices.

After a specified period of time of filtration, it will be necessary to commence the sequential backwashing process for the individual cells or compartments to remove the particulate matter lodged in the media during filtration.

A six cell design is disclosed as the preferred embodiment of U.S. Pat. No. 4,308,141. In such a modular filter system, the backwashing process is commenced by closing the effluent discharge and aligning the hood C with the first of the six cells to be backwashed. A microprocessor (not shown) controls all of the backwash functions and positions the hood C accurately over each cell to be backwashed. Once the hood C is positioned over a given cell to be backwashed, the hood C is lowered such that it is in fluid tight connection with the cell to be backwashed. Preferably, the fluid tight connection between the hood C and any given cell is as described in U.S. Pat. No. 4,308,141. Once again, it must be kept in mind that any suitable means can be used for achieving the fluid tight connection between the hood C and any given cell. Once the fluid tight connection is achieved, the backwash pump housed in pump house B is turned on to induce the flow of fluid upward through the underdrain E, the filter media and the hood C. Preferably, the backwash pump is of the type described in U.S. Pat. No. 4,308,141. However, any suitable device may be used for directing flow of fluid upwardly. Preferably the hood C includes a horizontal baffle plate as described in U.S. Pat. No. 4,308,141. This baffle plate assures a uniform expansion of the media and a balanced rate of effluent upflow through the hood. It will be understood that other devices may be used to accomplish the objectives of the baffle plate. The hood C also preferably includes upper and lower displacement accelerators as described in U.S. Pat. No. 4,308,141. The accelerators compensate for the reduced flow rate in the vicinity of the baffle plate. Once again, it will be appreciated that other means may be employed to accomplish the objective of the accelerators.

The backwash fluid used to expand and wash the media in a given cell is supplied by the surrounding cells through the common underdrain E. The contaminated backwash fluid is discharged through conventional piping into trough F.

Preferably, a jet wash pump and associated components as described in U.S. Pat. No. 4,308,141, are employed to achieve a more thorough cleaning of the filter media of any given cell. The jet pump and associated components provide a fluid scour to further cleanse the media as described in U.S. Pat. No. 4,308,141. However, it will be readily appreciated that other scour systems may be employed including an air scour system.

Once a given cell has been backwashed, the hood C is raised and moved to the next cell to be backwashed. This procedure is followed until all of the cells are backwashed.

The docking of the probe 6 with the docking station 8 upon backwashing of the last cell 16 will now be described. The pump house B and hood C are moved into alignment with the last cell 16. This causes the probe 6 to engage in a fluid tight manner with the docking station 8 thereby depressing the gate of the swing type check valve into the open position as shown in FIG. 1. The hood C is then lowered and the backwash procedure is performed on the last cell 16. The backwash procedure is as described above. Once the backwash procedure is finished, a filter to waste step is performed on the last cell 16.

Preferably, the hood C is raised prior to initiating the filter to waste process. However, it should be noted that the hood C could be in either the raised or lowered position when the filter to waste step is performed. The filter to waste step is initiated by turning the pump 2 on. This in turn causes fluid to flow upwardly from the effluent gullet 20 through conduit 10, probe 6 and discharge conduit 4 out into trough F. The fluid primarily drawn through the piping described above is from the last cell or compartment 16. This is due to the location of the conduit 10 in close proximity to the last cell 16. With the hood C in the raised position, influent will be drawn downwardly through the last cell 16 into gullet 20. Alternatively, means may be provided to allow for the passage of influent through the hood C when in the lowered position. The filter to waste step allows for the removal of any additional particulate matter not previously removed during the backwashing procedure. Preferably, the filter to waste step is performed for a time interval of anywhere from 2 minutes to 15 minutes. However, the duration of the filter to waste step may be varied outside of this range depending upon the particulars of a given site. After the filter to waste step is performed, a bank of cells may be returned to the filtration mode or cycle by opening the effluent discharge valve.

FIG. 3

Referring to FIG. 3, one of many alternative designs of the present invention is depicted. Specifically, the reservoir 22 includes twenty (20) individual cells or compartments. Like the embodiment described in connection with FIGS. 1 and 2, all of these cells share a common underdrain and plenum which discharges effluent through discharge outlet 24. As a further alternative, the reservoir may include a plurality of banks of multiple individual filter cells. For example, a given bank may include two or more individual filter cells. Preferably, each bank would have its own underdrain and common plenum. In such an arrangement, a single pump house B and hood C could be used to backwash each of the cells in the plurality of banks. Further, a filter to waste suction conduit similar to conduit 10 would be positioned in close proximity with the last cell to be backwashed of each of the banks of cells.

While this invention has been described as having a preferred design, it is understood that it is capable of further modifications, uses and/or adaptations of the invention following in general the principle of the invention and including such departures from the present invention as come within the known or customary practice in the art to which the invention pertains and as may be applied to the central features hereinbefore set forth, and fall within the scope of the invention and the limits of the appended claims.

We claim:

1. A modular filter system for filtering water or wastewater, comprising:
   (a) a reservoir housing for containing fluid;
   (b) a plurality of filter cells disposed in said reservoir housing for filtering influent passed through said reservoir housing, each of said plurality of filter cells having at least one layer of media;
   (c) a moveable backwash assembly for sequentially backwashing said plurality of filter cells;
   (d) a filter to waste assembly for performing a filter to waste procedure on a last filter cell of said plurality of filter cells to be backwashed, at least a portion of said filter to waste assembly being fixed to and movable with at least a portion of said backwash assembly; and,
   (e) a single underdrain in fluid communication with each of said plurality of filter cells.

2. A modular filter system as set forth in claim 1, wherein:
   (a) said filter to waste assembly includes a pump mounted on said backwash assembly.

3. A modular filter system as set forth in claim 2, wherein:
   (a) said filter to waste assembly further includes a filter to waste discharge conduit operably connected to said filter to waste pump.

4. A modular filter system for filtering water or wastewater, comprising:
   (a) a reservoir housing for containing fluid;
   (b) a plurality of filter cells disposed in said reservoir housing for filtering influent passed through said reservoir housing, each of said plurality of filter cells having at least one layer of media;
   (c) a moveable backwash assembly for sequentially backwashing said plurality of filter cells;
   (d) a filter to waste assembly for performing a filter to waste procedure on a last filter cell of said plurality of filter cells to be backwashed, at least a portion of said filter to waste assembly being fixed to and movable with at least a portion of said backwash assembly; and,
   (e) said filter to waste assembly including a pump mounted on said backwash assembly, said filter to waste assembly further including a filter to waste discharge conduit operably connected to said filter to waste pump, said filter to waste assembly further including a docking station having a check valve.

5. A modular filter system as set forth in claim 4, wherein:
   (a) said check valve is fixed relative to said reservoir housing.

6. A modular filter system as set forth in claim 5, wherein:
(a) said backwash assembly is moveable relative to said check valve.

7. A modular filter system as set forth in claim 6, wherein:
(a) said check valve is a swing type check valve.

8. A modular filter system as set forth in claim 4, wherein:
(a) said filter to waste assembly further includes a filter to waste suction conduit, said docking station is fixed to said filter to waste suction conduit in a fluid tight manner.

9. A modular filter system as set forth in claim 8, wherein:
(a) said docking station further includes an expansion joint.

10. A modular filter system as set forth in claim 9, wherein:
(a) said filter to waste conduit includes first and second sections, said first section is disposed at substantially a right angle to said second section.

11. A modular filter system for filtering water or wastewater, comprising:
(a) a reservoir housing for containing fluid, said reservoir housing having an effluent gullet;
(b) a plurality of filter cells disposed in said reservoir housing for filtering influent passed through said reservoir housing, each of said plurality of filter cells having at least one layer of media;
(c) a moveable backwash assembly for sequentially backwashing said plurality of filter cells, said moveable backwash assembly being disposed above at least one of said plurality of filter cells; and,
(d) a filter to waste assembly for performing a filter to waste procedure on a last cell of said plurality of filter cells to be backwashed, said filter to waste assembly having a filter to waste suction conduit having first and second portions, said first portion of said filter to waste conduit penetrates said effluent gullet and said second portion extends above an uppermost portion of said last filter cell.

12. A modular filter system as set forth in claim 11, wherein:
(a) said filter to waste assembly includes a pump fixed to and moveable with at least a portion of said backwash assembly.

13. A modular filter system as set forth in claim 12, wherein:
(a) said filter to waste assembly further includes a filter to waste discharge conduit operably connected to said filter to waste pump.

14. A modular filter system as set forth in claim 13, wherein:
(a) said filter to waste assembly further includes a docking station having a check valve.

15. A modular filter system as set forth in claim 14, wherein:
(a) said check valve is fixed relative to said reservoir housing.

16. A modular filter system as set forth in claim 15, wherein:
(a) said backwash assembly is moveable relative to said check valve.

17. A modular filter system as set forth in claim 16, wherein:
(a) said check valve is a swing type check valve.

18. A modular filter system as set forth in claim 14, wherein:
(a) said filter to waste assembly further includes a filter to waste suction conduit, said docking station is fixed to said filter to waste suction conduit in a fluid tight manner.

19. A modular filter system as set forth in claim 18, wherein:
(a) said docking station further includes an expansion joint.

20. A modular filter system as set forth in claim 19, wherein:
(a) said filter to waste conduit includes first and second sections, said first section is disposed at substantially a right angle to said second section.

21. Method of operating a modular filter system, comprising the steps of:
(a) providing a reservoir housing for containing fluid;
(b) forming a plurality of filter cells in the reservoir housing for filtering influent passed through the reservoir housing, each of the plurality of filter cells having at least one layer of media;
(c) providing a moveable backwash assembly for sequentially backwashing the plurality of filter cells;
(d) providing a filter to waste assembly for performing a filter to waste cycle on a last filter cell to be backwashed of the plurality of filter cells, the waste assembly having first and second elements;
(e) configuring the filter to waste assembly such that it can only perform a filter to waste cycle on the last filter cell to be backwashed of the plurality of filter cells;
(f) moving the backwash assembly over the last cell to be backwashed thereby connecting the first and the second elements in a fluid tight manner; and,
(g) subsequently performing a filter to waste cycle on only the last filter cell to be backwashed.

22. A modular filter system for filtering water or wastewater, comprising:
(a) a reservoir housing for containing fluid;
(b) an effluent channel;
(c) a plurality of filter cells disposed in said reservoir housing for filtering influent passed through said reservoir housing, each of said plurality of filter cells having at least one layer of media;
(d) a moveable backwash assembly for sequentially backwashing said plurality of filter cells; and,
(e) a filter to waste assembly for performing a filter to waste procedure on a last filter cell of said plurality of filter cells to be backwashed, said filter to waste assembly having a plurality of moveable members, all moveable members of said filter to waste assembly being removed from said effluent channel.

23. A modular filter system for filtering water or wastewater, comprising:
(a) a reservoir housing for containing fluid;
(b) an effluent channel;
(c) a plurality of filter cells disposed in said reservoir housing for filtering influent passed through said reservoir housing, each of said plurality of filter cells having at least one layer of media;
(d) a moveable backwash assembly for sequentially backwashing said plurality of filter cells; and,
(e) a filter to waste assembly for performing a filter to waste procedure on a last filter cell of said plurality of filter cells to be backwashed, said filter to waste assembly being configured such that all connecting members connecting two or more portions of said filter to waste assembly are disposed above the last filter cell.

\* \* \* \* \*